United States Patent
Kita et al.

(10) Patent No.: US 6,586,518 B1
(45) Date of Patent: Jul. 1, 2003

(54) RESIN COMPOSITION CAPABLE OF LASER MARKING METHOD, AND MARKED MOLDED ARTICLE

(75) Inventors: Masami Kita, Kobe (JP); Hiroshi Sagane, Sakai (JP); Takashi Matsumoto, Matsudo (JP); Kazuhiko Saeki, Himeji (JP)

(73) Assignee: Daicel Chemical Industries, Ltd., Osaka (JP)

( * ) Notice: Subject to any disclaimer, the term of this patent is extended or adjusted under 35 U.S.C. 154(b) by 0 days.

(21) Appl. No.: 09/744,596

(22) PCT Filed: Jul. 26, 1999

(86) PCT No.: PCT/JP99/03976

§ 371 (c)(1),
(2), (4) Date: Jan. 26, 2001

(87) PCT Pub. No.: WO00/06644

PCT Pub. Date: Feb. 10, 2000

(30) Foreign Application Priority Data

Jul. 27, 1998 (JP) .......................................... 10-226511

(51) Int. Cl.$^7$ ................................................. C08K 3/04
(52) U.S. Cl. ...................... 524/496; 524/495; 524/322; 524/394
(58) Field of Search ................................. 524/495, 496, 524/394, 395, 300, 322

(56) References Cited

U.S. PATENT DOCUMENTS 5,489,639 A * 2/1996 Faber et al. ................. 524/417

FOREIGN PATENT DOCUMENTS

| JP | A5331373 | 12/1993 |
| JP | A6136273 | 5/1994 |
| JP | A7278446 | 10/1995 |
| JP | A7286074 | 10/1995 |
| JP | A7290827 | 11/1995 |
| JP | A10237319 | 9/1998 |
| JP | A10305661 | 11/1998 |
| JP | A11181104 | 7/1999 |
| WO | A1-9701446 | 1/1997 |

OTHER PUBLICATIONS

Inorganic Database, "Material Database" pp. 700–714 (1989).

* cited by examiner

Primary Examiner—Edward J. Cain
(74) Attorney, Agent, or Firm—Birch, Stewart, Kolasch & Birch, LLP

(57) ABSTRACT

A resin composition capable of laser marking according to the present invention includes a polyolefin resin in combination with a laser-sensitive component such as a carbon black or metallic compound white pigment and a dispersing aid such as a higher fatty acid compound. The polyolefin resin includes, for example, a polypropylene. The resin composition may further include about 0.5 to 30 parts by weight of an elastomer relative to 100 parts by weight of the polyolefin resin. By irradiating an surface of a molded article obtained from the resin composition with a laser, a mark having a sharp and uniform contrast can be formed on the surface of the molded article.

10 Claims, No Drawings

RESIN COMPOSITION CAPABLE OF LASER MARKING METHOD, AND MARKED MOLDED ARTICLE

This application is the national phase under 35 U.S.C. §371 of PCT International Application No. PCT/JP99/03976 which has an International filing date of Jul. 26, 1999, which designated the United States of America.

TECHNICAL FIELD

The present invention relates to a resin composition where, for example, a character, a symbol, a picture or a photograph can be marked with a laser on a surface of a molded article, to a method for the marking of a molded article obtained from the resin composition, and to a marked molded article.

BACKGROUND ART

Conventionally, as methods for laser printing on a surface of a molded article composed of a polyolefin resin, a method in which a silicon substance is incorporated into the resin as indicted in, for example, Japanese Unexamined Patent Application Publication No. 7-286074, and a method in which a metal such as aluminium or copper is incorporated into the resin as disclosed in Japanese Unexamined Patent Application Publication No. 1-224186 are known. However, such a silicon substance has a poor compatibility with a polyolefin and frequently becomes poorly dispersed. As a result, a sharp printing with a laser cannot be significantly expected. When

DISCLOSURE OF INVENTION

Accordingly, an object of the present Invention is to provide a resin composition and marking method which can form a mark having a sharp and uniform contrast on a surface of a molded article with a laser, as well as a molded article on a surface of which a mark having a sharp and uniform contrast is formed.

Another object of the present invention is to provide a resin composition and marking method which can laser mark without deterioration in workability and mechanical characteristics, as well as a molded article which is marked without deterioration in workability and mechanical characteristics.

After intensive investigations to achieve the above objects, the present inventors found that when a molded article obtained from a resin composition including a polyolefin resin in combination with specific components is irradiated with a laser, printing with a sharp and uniform contrast can be formed on a surface of the molded article. The present invention has been accomplished based on these findings.

Specifically, the present invention provides (i) a resin composition for white marking, which is capable of laser marking and includes a polyolefin resin in combination with a carbon black having a mean particle size of 10 to 100 nm and a dispersing aid selected from higher fatty acids and higher fatty acid amides, and is capable of white printing with a laser, and (ii) a resin composition so black marking, which is capable of laser marking, includes a polyolefin resin in combination with a carbon black having a mean particle size of 10 to 100 nm, a metallic compound white pigment, and a dispersing aid selected from higher fatty acid compounds, and is capable of black printing with a laser.

In another aspect, the present invention provides a method for white marking of a molded article, which includes the step of irradiating a surface of a molded article with a laser to thereby mark the surface in white, which molded article is obtained from the resin composition (i) for white marking, and a method for black marking of a molded article, which includes the step of irradiating a surface of a molded article with a laser to thereby mark the surface in black, which molded article Us obtained from the resin composition (ii) for black marking.

In addition and advantageously, the present invention provides a molded article which is composed of the resin composition (i) for white marking and has a surface marked in white with a laser, and a molded article which is composed of the resin composition (ii) for black marking and has a surface marked in black with a laser.

BEST MODE FOR CARRYING OUT THE INVENTION

A polyolefin resin for use in the present invention may be any of olefinic homopolymers and copolymers (random copolymers, and block copolymers) characteristics.

After intensive investigations to achieve the above objects, the present inventors found that when a molded article obtained from a resin composition including a polyolefin resin in combination with specific components is irradiated with a laser, printing with a sharp and uniform contrast can be formed on a surface of the molded article. The present invention has been accomplished based on these findings.

Specifically, the present invention provides a resin composition capable of laser marking, which includes a polyolefin resin in combination with a laser-sensitive component and a dispersing aid.

In another aspect, the present invention provides a method for marking a molded article, which includes the step of irradiating and marking a surface of a molded article with a laser, which molded article is obtained from the resin composition.

Additionally, the present invention provides a molded article which is composed of the resin composition and has a surface marked with a laser.

BEST MODE FOR CARRYING OUT THE INVENTION

Polyolefin resins for use in the present invention may be any of olefinic homopolymers and copolymers (random copolymers, and block copolymers), such as polypropylenes, polyethylenes, and other olefinic homopolymers; ethylene-propylene copolymers, and other copolymers each containing propylene as a monomeric component; and ethylene-vinyl acetate copolymers and other copolymers each containing ethylene as a monomeric component. Among them, a polypropylene (PP) can be most advantageously used, from the viewpoint of, for example, balance in physical properties, heat resistance, and price. The polypropylene preferably has a melt flow rate (MFR) of about 0.5 to 50 (g/10 min.) and a flexural modulus of about 10000 to 18000 $kgf/cm^2$. If MFR is excessively low, a usual molding tends to be difficult, in contrast, if it is excessively high, sufficient mechanical strengths cannot be significantly obtained. If the flexural modulus is excessively low, the resulting resin becomes too soft and tends to invite creep in use, in contrast, if it is excessively high, the resulting resin becomes too hard and tends to invite cracking in use.

The invented resin composition may further comprise other resins in addition to the polyolefin resin. For example, the resin composition can comprise olefinic, styrenic, polyester-based, polyamide-based, and other elastomers (including natural rubbers, synthetic rubbers, and thermoplastic elastomers) to thereby control elastic modulus, when a resin having a high crystallinity and a high elastic modulus such as a polypropylene or polyethylene is used as the polyolefin resin. The amount of the elastomer is, for example, about 0.5 to 30 parts by weight, and preferably about 5 to 25 parts by weight relative to 100 parts by weight of the polyolefin resin when a polypropylene or the like is used as the polyolefin resin. If the amount of the elastomer is excessively small, advantages of the addition of the elastomer cannot be obtained. In contrast, if it is excessively large, the elastic modulus becomes excessively low to thereby deteriorate dimensional stability of the resulting molded article in some cases.

Laser-sensitive components (laser-susceptible components) for use in the present invention include, for example, components that physically or chemically change with laser irradiation. Known or conventional laser-susceptible components which are used in marking with the use of a laser can be used. Such components include, but are not limited to, a carbon black and other black pigments, metallic compound white pigments, and other inorganic pigments. Each of these components can be used alone or in combination. A mark in a desired color can be formed by appropriately selecting the type of the laser-sensitive component. Generally, the use of a black pigment such as a carbon black can yield white printing, and the use of a white pigment such as a metallic compound white pigment can yield black printing. In this connection, the combination use of a white pigment such as a metallic compound pigment and a black pigment such as a carbon black can yield a very sharp black marking.

A variety of carbon black can be used as the carbon black regardless of materials and production methods. Such carbon black includes, but is not limited to, furnace black, channel black, acetylene black, and ketjen black. The particle size and oil absorption of the carbon black tend to affect marking properties. The carbon black preferably has a mean particle size of about 10 to 100 nm and an oil absorption of about 50 to 500 ml/g. If the carbon black has an excessively small mean particle size or an excessively large oil absorption, particles are too fine and handling property tends to be deteriorated. If the carbon black has an excessively large mean particle size or an excessively small oil absorption, dispersibility is decreased to thereby deteriorate the appearance of the molded article.

The metallic compound white pigment includes, but is not limited to, titanium oxide, lead oxide, zinc oxide, and other metal oxides; talc (magnesium silicate), calcium carbonate, potassium titanate, and other metal salts (carbonates, silicates, titanates, and other oxo acid salts of metals). Among them, titanium oxide is particularly advantageously used. Each of these metallic compound white pigments can be used alone or in combination.

The amount of the laser-sensitive component can be appropriately selected, depending on the type of the component, within a range of about 0.005 to 50% by weight relative to the overall resin composition. For example, when a carbon black is used as the laser-susceptible component, the amount is about 0.01 to 5% by weight, preferably about 0.03 to 4% by weight, and more preferably about 0.05 to 3% by weight, relative to the overall resin composition. When the metallic compound white pigment is used, the amount is about 0.2 to 50% by weight, and preferably about 0.5 to 40% by weight relative to the overall resin composition. If the amount of the laser-sensitive component is excessively small, printing (white printing or black printing) having a sharp contrast cannot be significantly obtained. If the amount is excessively large, dispersibility is decreased, frequently resulting in a decreased resolution in a printed region.

Dispersing aids for use in the present invention are not particularly limited as far as they can improve dispersibility of the laser-susceptible component. Preferably, fatty acid compounds are used. Such fatty acid compounds include saturated or unsaturated fatty acids having two or more carbon atoms (e.g., about 2 to 32 carbon atoms) or derivatives (e.g., salts, esters, and amides) of these fatty acids. Preferred fatty acid compounds include, but are not limited to, lauric acid, myristic acid, palmitic acid, stearic acid, oleic acid, linoleic acid, linolenic acid, and other higher fatty acids (e.g., fatty acids each having about 10 to 20 carbon atoms); zinc laurate, calcium stearate, zinc stearate, sodium oleate, and other salts (e.g., alkali metal salts, alkaline earth metal salts, and zinc salts) of the higher fatty acids; ethylenebisstearamide, lauramide, and other amides of the higher fatty acids; and other higher fatty acid compounds (higher fatty acids or derivatives thereof).

The amount of the dispersing aid is, for example, about 0.005 to 6% by weight, and preferably about 0.01 to 5% by weight relative to the overall resin composition. If the amount of the dispersing aid is excessively small, dispersibility of the laser-sensitive component is low, and a sharp printing cannot significantly obtained. If the amount of the dispersing aid is excessively large, there may be a problem such that the dispersing aid evaporates or sublimes in molding process and adheres to a mold (die).

Methods for preparing the resin composition capable of laser marking in the present invention include (1) a method in which predetermined amounts of the polyolefin resin, laser-sensitive component, dispersing aid, and where necessary other resins (e.g., an elastomer) and additives are mixed, and the resulting mixture is kneaded and is pelletized by a conventional melting kneading process. Alternatively, (2) the laser-sensitive compound, dispersing aid, and the like are mixed to yield a master batch, and a predetermined amount of the master batch is compounded into the polyolefin resin, and the resulting mixture is molded as intact.

According to the invented method for marking a molded article, a surface of a molded article obtained from the invented resin composition is irradiated with a laser and is marked.

The molded article can be obtained by conventional molding processes for use in molding (forming) of plastics, such as extrusion molding (film, sheet, deformed), injection molding, blow molding, and compression molding.

The type of lasers for use in marking is not particularly limited and the laser may be any of, for example, gas lasers, semiconductor lasers, and excimer lasers. Among them, Nd:YAG laser is most advantageously used. The technique for marking is not particularly limited, and marking can be performed by known or conventional techniques. To improve marking precision, a technique is preferred in which a laser is condensed into a spot having an appropriate size by a conventionally known optical technique, and the resulting laser spot is applied on a surface of the molded article with a scanning apparatus having a combination of a plurality of optical mirrors controlled by a computer so as to form a mark having a desired shape. The type of marking is not particularly limited and may be any of, for example, characters, symbols, graphics, pictures and photographs.

The invented marking method can easily yield a molded article having, on a surface, a mark having a desired shape with a sharp and uniform contrast.

The invented resin composition capable of laser marking and marking method, in which specific components are compounded into a polyolefin resin, can form, with a laser, a mark having a sharp and uniform contrast on a surface of a molded article.

Additionally, in the invented marked molded article, a mark formed on a surface has a sharp and uniform contrast.

In addition and advantageously, workability and mechanical characteristics of the resin composition and molded article are not deteriorated.

The present invention will be illustrated in further detail with reference to several examples below, which are not intended to limit the scope of the invention. The following polymers, carbon blacks, metallic compounds, and dispersing aids were used in examples and comparative examples.

[Polymer]p PP: a polypropylene having MI (=MFR) of 10 (g/10 min.) and a flexural modulus of 13000 kgf/cm$^2$ PP/Elastomer: a substance obtained by melting and blending 80 parts by weight of the aforementioned PP and 20 parts by weight of an elastomer [produced by Sumitomo Chemical Co., Ltd. under the trade name of "BONDINE HX8290"] with a conventional extruder PE/Elastomer: a substance obtained by melting and blending 80 parts by weight of [a product of Mitsui Chemicals, Inc. under the trade name of "HIZEX 1300J"] and 20 parts by weight of an elastomer [produced by Sumitomo Chemical Co., Ltd. under the trade name of "BONDINE HX8290"] with a conventional extruder

[Carbon Black (CB)]

CB-1: furnace black (mean particle size: 20 nm)
CB-2: acetylene black (mean particle size: 40 nm)
CB-3: ketjen black (mean particle size: 25 nm)
 [Metallic Compound]

M-1: titanium oxide
M-2: zinc oxide
M-3: potassium titanate

[Dispersing Aid]

DA-1: ethylenebisstearamide
DA-2: stearic acid
DA-3: zinc stearate
DA-4: calcium stearate.

EXAMPLES 1 TO 8

Resin compositions capable of marking in white were respectively prepared by mixing a polymer, a carbon black (as a laser-susceptible component), and a dispersing aid in a proportion indicated in Table 1, and a series of molded plate articles having a thickness of 2 mm were obtained therefrom by injection molding. A surface of each of the molded articles was laser marked and a sharp printing could be formed in any case.

EXAMPLES 9 TO 14

Resin compositions capable of marking in black were respectively prepared by mixing a polymer, a metallic compound (as a laser-susceptible component), and a dispersing aid in a proportion indicated in Table 2, and a series of molded plate articles having a thickness of 2 mm were obtained therefrom by injection molding. A surface of each of the molded articles was laser marked and a sharp printing could be formed in any case.

EXAMPLES 15 TO 17

Resin compositions capable of marking in black were respectively prepared by mixing a polymer, a metallic compound and a carbon black (as laser-susceptible components), and a dispersing aid in a proportion indicated in Table 3, and a series of molded plate articles having a thickness of 2 mm were obtained therefrom by injection molding. A surface of each of the molded articles was laser marked and a sharp printing could be formed in any case.

Comparative Examples 1 to 6

Resin compositions capable of marking in white were respectively prepared by mixing a polymer, a carbon black, and a dispersing aid in a proportion indicated in Table 4, and a series of molded plate articles having a thickness of 2 mm were obtained therefrom by injection molding. A surface of each of the molded articles was laser marked and no sharp printing could be formed in any case.

Comparative Examples 7 to 10

Resin compositions capable of marking in black were respectively prepared by mixing a polymer, a metallic compound, and a dispersing aid in a proportion indicated in Table 5, and a series of molded plate articles having a thickness of 2 mm were obtained therefrom by injection molding. A surface of each of the molded articles was laser marked and no sharp printing could be formed in any case.

TABLE 1

| | Polymer | | Carbon Black | | Dispersing aid | | | |
|---|---|---|---|---|---|---|---|---|
| | Type | Amount (wt %) | Type | Amount (wt %) | Type | Amount (wt %) | Type of Laser Mark | Printing Quality |
| Ex. 1 | PP | 99.94 | CB-1 | 0.05 | DA-1 | 0.01 | white mark | sharp |
| Ex. 2 | PP | 99.6 | CB-1 | 0.2 | DA-1 | 0.2 | white mark | sharp |
| Ex. 3 | PP | 98.5 | CB-1 | 1 | DA-1 | 0.5 | white mark | sharp |
| Ex. 4 | PP | 96 | CB-1 | 3 | DA-1 | 1 | white mark | sharp |
| Ex. 5 | PP | 98.5 | CB-1 | 1 | DA-2 | 0.5 | white mark | sharp |
| Ex. 6 | PP | 98 | CB-1 | 1 | DA-2 | 1 | white mark | sharp |
| Ex. 7 | PP | 98.2 | CB-2 | 1 | DA-3 | 0.8 | white mark | sharp |
| Ex. 8 | PP | 98.2 | CB-3 | 1 | DA-3 | 0.8 | white mark | sharp |

TABLE 2

|  | Polymer | | Metallic Compound | | Dispersing aid | | Type of Laser Mark | Printing Quality |
|---|---|---|---|---|---|---|---|---|
|  | Type | Amount (wt %) | Type | Amount (wt %) | Type | Amount (wt %) | | |
| Ex. 9 | PP | 99.29 | M-1 | 0.7 | DA-1 | 0.01 | black mark | sharp |
| Ex. 10 | PP | 98.8 | M-1 | 1 | DA-1 | 0.2 | black mark | sharp |
| Ex. 11 | PP | 89.5 | M-1 | 10 | DA-1 | 0.5 | black mark | sharp |
| Ex. 12 | PP | 69 | M-1 | 30 | DA-1 | 1 | black mark | sharp |
| Ex. 13 | PP | 89.5 | M-2 | 10 | DA-1 | 0.5 | black mark | sharp |
| Ex. 14 | PP | 89 | M-3 | 10 | DA-1 | 1 | black mark | sharp |

TABLE 3

|  | Polymer | | Metallic Compound | | Carbon Black | | Dispersing aid | | Type of Laser Mark | Printing Quality |
|---|---|---|---|---|---|---|---|---|---|---|
|  | Type | Amount (wt %) | Type | Amount (wt %) | Type | Amount (wt %) | Type | Amount (wt %) | | |
| Ex. 15 | PP | 88.5 | M-1 | 10 | CB-1 | 1 | DA-1 | 0.5 | black mark | sharp |
| Ex. 16 | PP/Elastomer | 88.5 | M-1 | 10 | CB-1 | 1 | DA-1 | 0.5 | black mark | sharp |
| Ex. 17 | PE/Elastomer | 88.5 | M-1 | 10 | CB-1 | 1 | DA-1 | 0.5 | black mark | sharp |

TABLE 4

|  | Polymer | | Carbon Black | | Dispersing aid | | Type of Laser Mark | Printing Quality |
|---|---|---|---|---|---|---|---|---|
|  | Type | Amount (wt %) | Type | Amount (wt %) | Type | Amount (wt %) | | |
| Com. Ex. 1 | PP | 99.995 | CB-1 | 0.005 | DA-1 | 0 | white mark | illegible with low contrast |
| Com. Ex. 2 | PP | 90 | CB-1 | 10 | DA-1 | 0 | white mark | unsharp with poor CB dispersion |
| Com. Ex. 3 | PP | 99 | CB-1 | 0 | DA-1 | 1 | white mark | out of printing |
| Com. Ex. 4 | PP/Elastomer | 99 | CB-2 | 0 | DA-3 | 1 | white mark | out of printing |
| Com. Ex. 5 | PE/Elastomer | 99 | CB-2 | 1 | DA-3 | 0 | white mark | unsharp with poor CB dispersion |
| Com. Ex. 6 | PP | 99 | CB-3 | 1 | DA-3 | 0 | white mark | unsharp with poor CB dispersion |

TABLE 5

|  | Polymer | | Metallic Compound | | Dispersing aid | | Type of Laser Mark | Printing Quality |
|---|---|---|---|---|---|---|---|---|
|  | Type | Amount (wt %) | Type | Amount (wt %) | Type | Amount (wt %) | | |
| Com. Ex. 7 | PP | 95 | M-1 | 5 | DA-1 | 0 | black mark | unsharp with poor titanium oxide dispersion |
| Com. Ex. 8 | PP | 99 | M-1 | 0 | DA-1 | 1 | black mark | illegible with unsharp printing |
| Com. Ex. 9 | PP | 90 | M-1 | 10 | DA-2 | 0 | black mark | unsharp with poor titanium oxide dispersion |
| Com. | PP | 99 | M-1 | 0 | DA-4 | 1 | black | illegible |

TABLE 5-continued

| | Polymer | | Metallic Compound | | Dispersing aid | | Type of Laser Mark | Printing Quality |
|---|---|---|---|---|---|---|---|---|
| | Type | Amount (wt %) | Type | Amount (wt %) | Type | Amount (wt %) | | |
| Ex. 10 | | | | | | | mark | with unsharp printing |

What is claimed is:

1. A resin composition for white marking, which is capable of laser marking and is capable of printing in white with a laser, comprising a polyolefin resin in combination with a carbon black having a mean particle size of 10 to 100 nm and a dispersing aid selected from higher fatty acids and higher fatty acid amides, wherein said carbon black and dispersing aid are present, respectively, in an amount of 0.03 to 4% by weight and in an amount of 0.005 to 6% by weight, relative to the weight of the overall resin composition.

2. A resin composition for black marking, which is capable of laser marking and is capable of printing in black with a laser, comprising a polyolefin resin in combination with a carbon black having a mean particle size of 10 to 100 nm, a metallic compound white pigment, and a dispersing aid selected from higher fatty acids and higher fatty acid amides, wherein said carbon black, metallic compound white pigment, and dispersing aid are present, respectively, in an amount of 0.03 to 4% by weight, in an amount of 0.2 to 50% by weight, and in an amounts of 0.005 to 6% by weight, relative to the weight of the overall resin composition.

3. The resin composition for black marking according to claim 2, wherein said higher fatty acid compounds are higher fatty acid amides.

4. The resin composition according to any one of claims 1 to 3, wherein said polyolefin resin is a polypropylene.

5. The resin composition according to any one of claims 1 to 3, further comprising an elastomer.

6. The resin composition according to claim 5, which comprises 0.5 to 30 parts by weight of the elastomer relative to 100 parts by weight of the polyolefin resin.

7. A method for white marking of a molded article, comprising the step of irradiating a surface of a molded article with a laser to thereby mark the surface in white, said molded article being made from a resin composition for white marking according to claim 1.

8. A method for black marking of a molded article, comprising the step of irradiating a surface of a molded article with a laser to thereby mark the surface in black, said molded article being made from a resin composition for black marking according to claim 2 or 3.

9. A molded article composed of the resin composition for white marking according to claim 1, said article having a surface which is marked in white with a laser.

10. A molded article composed of the resin composition for black marking according to claim 2 or 3, said article having a surface which is marked in black with a laser.

* * * * *